United States Patent [19]

Hong

[11] Patent Number: 5,278,714
[45] Date of Patent: Jan. 11, 1994

[54] ADJUSTABLE STRUCTURE FOR ATTACHING A ROTARY HEAD TO A ROTARY DRUM OF A VIDEO CASSETTE RECORDER

[75] Inventor: Sung H. Hong, Seoul, Rep. of Korea

[73] Assignee: Goldstar Co., Ltd., Seoul, Rep. of Korea

[21] Appl. No.: 58,794

[22] Filed: May 10, 1993

Related U.S. Application Data

[63] Continuation of Ser. No. 721,098, Jun. 25, 1991, abandoned.

[30] Foreign Application Priority Data

Jun. 30, 1990 [KR] Rep. of Korea ............... 9409/1990

[51] Int. Cl.⁵ ..................... G11B 5/53; G11B 21/24
[52] U.S. Cl. ........................... 360/107; 360/109
[58] Field of Search .... 360/84, 95, 85, 130.2–130.24, 137, 104, 109, 107

[56] References Cited

U.S. PATENT DOCUMENTS

| | | | |
|---|---|---|---|
| 3,207,517 | 9/1965 | Tanigawa et al. | 360/84 |
| 3,422,230 | 1/1969 | Tanigawa et al. | 360/84 |
| 4,297,735 | 10/1981 | Eppich | 360/104 |
| 4,337,492 | 6/1982 | Brookhart et al. | 360/109 |
| 4,605,978 | 8/1986 | Zeavin | 360/104 |
| 4,672,489 | 6/1987 | Wada et al. | 360/104 |
| 5,075,809 | 12/1991 | Heinz et al. | 360/84 |

FOREIGN PATENT DOCUMENTS

| | | | |
|---|---|---|---|
| 57-94918 | 6/1982 | Japan | 360/104 |
| 58-68274 | 4/1983 | Japan | 360/104 |
| 58-141427 | 8/1983 | Japan | 360/104 |
| 59-36323 | 2/1984 | Japan | 360/109 |
| 61-123074 | 6/1986 | Japan | 360/104 |
| 63-225903 | 9/1988 | Japan | 360/104 |
| 1-269212 | 10/1989 | Japan | 360/104 |

Primary Examiner—Robert S. Tupper
Attorney, Agent, or Firm—Fish & Richardson

[57] ABSTRACT

An apparatus for fixing rotary heads to an upper drum of a rotary drum of a video cassette recorder includes a guide projection formed on a lower surface of each of the rotary heads, guide grooves formed in the upper drum for engagement with the guide projections of the rotary heads, and setting means for fixing the rotary heads engaged with the guide grooves of the upper drum to the upper drum. The apparatus enables the rotary heads to be mounted on the upper drum simply, accurately, and at constant angular intervals.

10 Claims, 4 Drawing Sheets

ADJUSTABLE STRUCTURE FOR ATTACHING A ROTARY HEAD TO A ROTARY DRUM OF A VIDEO CASSETTE RECORDER

This application is a continuation of Ser. No. 07/721,098, filed Jun. 25, 1991, now abandoned.

BACKGROUND OF THE INVENTION

1. Field of the Invention

The present invention relates to an apparatus for fixing rotary heads to a rotary drum of a video cassette recorder (VCR), in which two or four heads are mounted on the drum at intervals of 180° or 90°.

2. Description of the Prior Art

Generally, a video cassette recorder is of a two-head type or a four-head type depending upon the number of rotary heads mounted on a rotary drum. In the case of the two-head type, the heads mounted on the drum are spaced from each other by 180°, while in the case of the four-head type, they are fixedly mounted on the drum at intervals of 90°. The rotary head is a very important part of the video cassette recorder. It functions to record an image on a tape traveling in contact with the rotary drum or to reproduce an image recorded on a tape. Therefore, the rotary head must be precisely mounted on the rotary drum in order to obtain excellent picture quality.

In a prior art apparatus, as shown in FIGS. 1 through 3 of the accompanying drawings, the rotary heads (3) are fixedly mounted on the rotary drum (1) by placing an upper drum (2) of the type shown in FIG. 2a on a jig for temporary assembly of the rotary heads, then temporarily assembling the heads (3) to the upper drum (2) by means of set screws (4) for fastening the rotary heads, and thereafter adjusting a given angle between the rotary heads, an amount of protrusion of the heads, a height difference, etc. by a separate adjustor.

The height difference between the rotary heads may be adjusted by means of screws (7) which are threaded in the upper drum (2) to contact the lower surfaces of the rotary heads (3). Subsequently, leg relays (5) are assembled to the upper drum (2) and soldered to signal grounding portions (6) of the rotary heads (3). The completed assembly of the upper drum (2) has a configuration as shown in FIG. 2b.

Assembled upper drum (2) is then assembled to a lower drum (8) to produce the rotary drum (1) as shown in FIG. 1.

The prior art apparatus for fixing the rotary heads is however disadvantageous in that since the rotary heads are pressed down by a soldering iron during the operation of soldering the leg relays (5) to the signal grounding portions (6) of the rotary heads, the angle between the rotary heads which has already been adjusted by use of the separate adjustor prior to the soldering operation may be varied, thereby resulting in deterioration of picture quality, for example, distortion of an upper picture portion, flexure of a picture, a color band, et. Further, since the amount of protrusion of the rotary head is determined by fixing the rotary head to the upper drum by means of the set screw which is fastened through a pre-formed hole in the head into a threaded hole pre-formed in the drum, it is difficult to adjust the extent of protrusion after assembly of the rotary head. When the given protrusion of the head is not constantly maintained, it is necessary to form another hole for the set screw in the head or change the position of the threaded hole of the upper drum. However, since forming of the new holes is substantially impossible, the parts must be replaced, thereby adversely affecting the cost of the product.

SUMMARY OF THE INVENTION

It is an object of the present invention to provide an apparatus for fixing rotary heads to a rotary drum of a video cassette recorder, so that an angle between the rotary heads mounted on an upper drum can be maintained constant of the rotary drum without using a separate adjustor.

There is provided, according to one form of the present invention, an apparatus for fixing a rotary head to a rotary drum of a view cassette recorder, that comprises a guide projection formed on a lower surface of each of the rotary heads, guide grooves formed in an upper drum of the rotary drum for engagement with the guide projections of the rotary heads, and setting means for fixing the rotary heads engaged with the respective guide grooves of the upper drum to the upper drum.

According to another form of the present invention, there is provided an apparatus for fixing rotary heads to the rotary drum according to the above form of the present invention, wherein the guide projection of the rotary head and the guide groove of the upper drum are of dovetail or circular cross-sectional shapes so as to smoothly engage with each other.

BRIEF DESCRIPTION OF THE DRAWINGS

The invention will now be described further, by way of example, with reference to the accompanying drawings, in which:

FIG. 2b is a bottom view of the upper drum shown in FIG. 2a;

FIG. 4b is a bottom view of the upper drum shown in FIG. 4a;

DESCRIPTION OF THE PREFERRED EMBODIMENT

Figure 1:
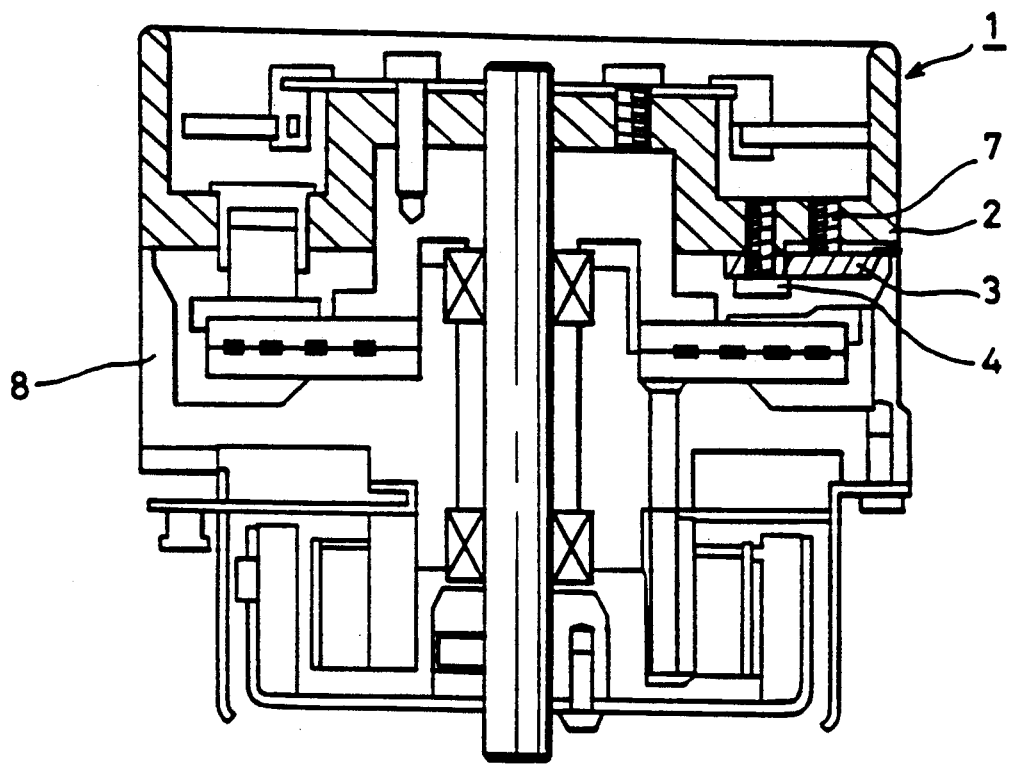
FIG. 1 is a schematic cross-sectional view of a rotary drum of a video cassette recorder having rotary heads fixed according to a prior art apparatus.
Figure 2A:
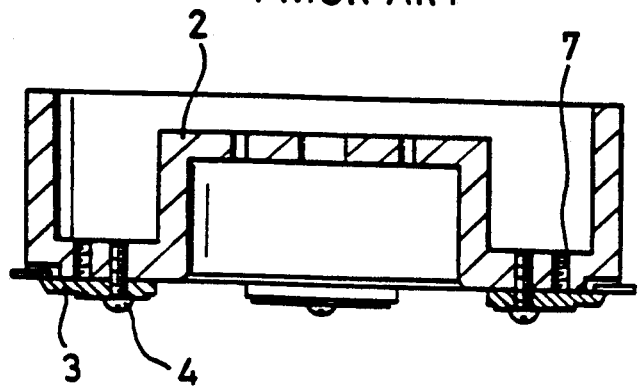
FIG. 2a is a vertical cross-sectional view of an upper drum portion of the rotary drum shown in FIG. 1.
Figure 2B:
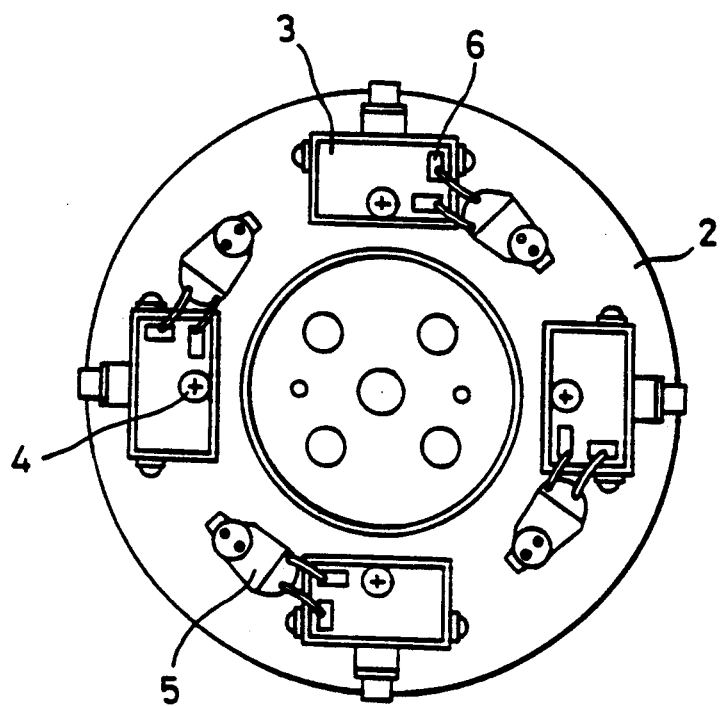
Figure 3:
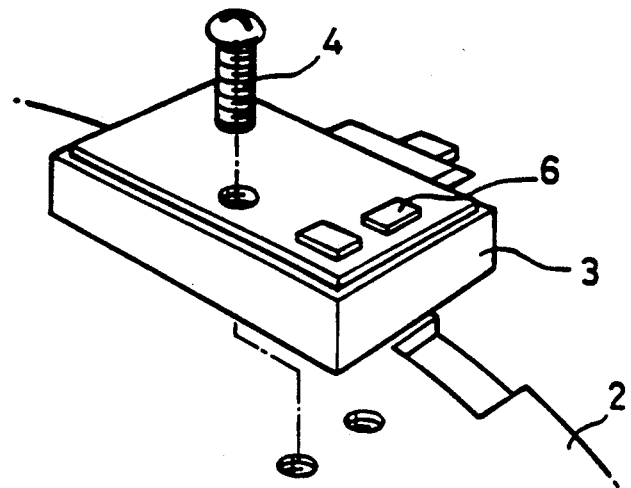
FIG. 3 is an exploded, bottom perspective view of the prior art apparatus for fixing the rotary head.
Figure 4A:
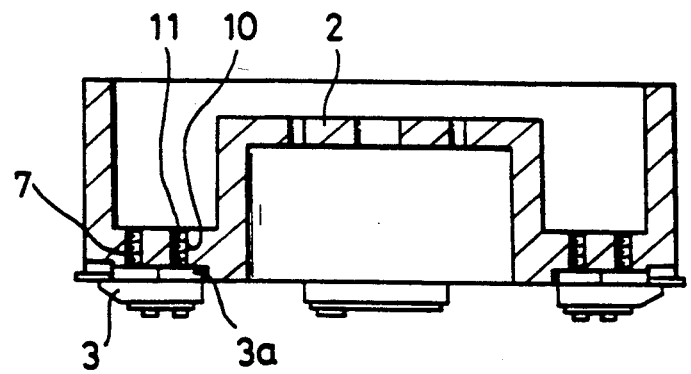
FIG. 4a is a vertical cross-sectional view of the upper drum having the rotary heads fixed thereto according to the present invention.
Figure 4B:
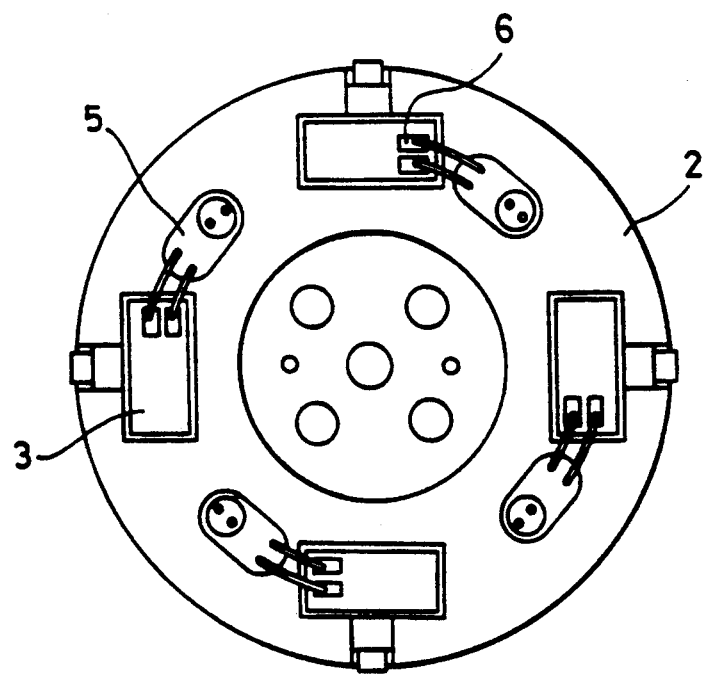

The novel features of the present invention will be more clearly understood upon making reference to FIGS. 4a and 4b which respectively illustrate cross-sectional and bottom views of an upper drum (2) having rotary heads (3) assembled thereto according to the present invention, as compared with FIGS. 2a and 2b showing the arrangement according to the prior art.

According to the present invention, the rotary head (3) has a guide projection (3a) formed on its lower surface, while the upper drum (2) is formed with guide grooves (2a), each of which receives the guide projection (3a).

Each of the guide grooves (2a) of the upper drum (2) is shaped to conform to the contour of the guide projection (3a) of the rotary head (3). The position and the number of the guide grooves (2a) formed in the upper drum (2) are determined depending upon a type of the head so that the grooves are circumferentially equally spaced and extend radially relative to a central rotational axis of the upper drum.

Figure 5:
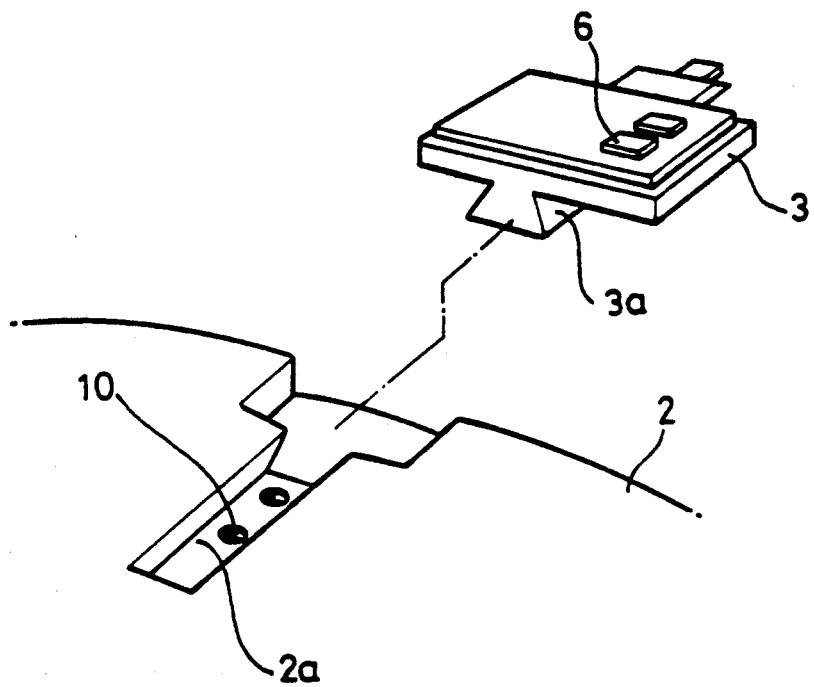
FIG. 5 is an exploded, bottom perspective view illustrating the manner of fixing the rotary heads to the upper drum according to one embodiment of the present invention.
Figure 6:
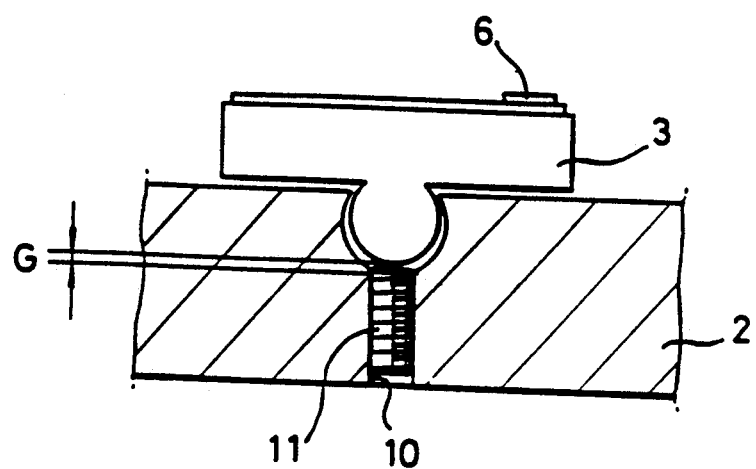
FIG. 6 is a cross-sectional view illustrating another embodiment of the present invention.

The guide projection (3a) of the rotary head (3) and the mating guide groove (2a) of the upper drum (2) are of dovetail cross-sectional shapes as shown in FIG. 5, or circular cross-sectional shapes as shown in FIG. 6 illustrating another embodiment of the present invention. However, they may be of any of various shapes other than the above as long as a smooth engagement of the guide projection (3a) with the guide groove (2a) is provided and variation in position after engagement is prevented.

Therefore, operation of assembling the rotary head (3) to the upper drum (2) may be easily accomplished by inserting the guide projection (3a) formed on the lower surface of the rotary head (3) into the guide groove (2a) of the upper drum (2). At this time, a gap (indicated by "G" in FIG. 6) between the guide projection (3a) and the guide groove (2a) is preferably determined to be less than 0.001 mm.

The value of the gap is defined to be less than 0.001 mm in order to naturally satisfy the tolerance of an angular deviation between the rotary heads, which is generally defined to be 0.002 mm.

When so assembled, the amount of protrusion of the rotary head (3) is adjusted by minutely sliding the rotary head in and along the guide groove (2a) of the upper drum (2), and thereafter the rotary head (3) is locked against threaded hole (10) formed in the upper drum (2). Then, a height or level of the rotary head (3) is adjusted by another screw (7) threaded in the upper drum (2). In this state, leg relays (5) are assembled to the upper drum and soldered to signal grounds (6) of the rotary heads, thereby completing assembly of the upper drum as shown in FIG. 4b.

According to the present invention, operation the of fixing the rotary heads to the upper drum at accurate, constant angular intervals may be simply effected merely by inserting the guide projections of the rotary heads into the guide grooves of the upper drum without using a separate adjustor, and precise adjustment of the extent of protrusion of each of the rotary heads may be easily accomplished by varying a position of the head slidable along the guide groove, thereby resulting in reducing the number of manufacturing processes and hence the manufacturing cost and enhancing picture quality of the video cassette recorder.

Having described the preferred embodiments of this invention, it will be apparent that many changes and modifications can be made therein without departing from the spirit and scope of the invention.

What is claimed is:

1. In a video cassette recorder having structure for fixing a rotary head to a rotary drum of the video cassette recorder, the structure comprising:
   an elongated guide projection formed on a lower surface of said rotary head;
   an elongated guide groove formed in an upper portion of said rotary drum for engagement with the guide projection of said rotary head;
   wherein said guide groove partially encompasses said guide projection and said guide projection being slidable in said guide groove when not fixed by a setting means;
   said guide projection and guide groove when engaged being positioned such that a line parallel to the length of the projection and groove has a significant component extending radially to the axis of rotation of the drum;
   setting means mounted on said upper drum which is adjustable for contacting said guide projection and fixing said guide projection of the rotary head to said upper drum within the guide groove of said upper drum with the guide projection in contact with the guide groove; and
   an adjustable member mounted on said upper drum, which member is arranged so that it may contact the guide projection of the rotary head and thereby adjust the height of said rotary head.

2. The structure for fixing a rotary head to a rotary drum of a video cassette recorded, as claimed in claim 1, wherein when engaged with each other, a gap between the guide projection of said rotary head and the guide groove of said upper drum is less than about 0.001 mm.

3. The structure for fixing a rotary head to a rotary drum of a video cassette recorded as claimed in claim 1, wherein the guide groove of said upper drum and the guide projection of said rotary head are of dovetail cross-sectional shapes.

4. The structure for fixing a rotary head to a rotary drum of a video cassette recorded as claimed in claim 1, wherein the guide groove of said upper drum and the guide projection of said rotary head are of circular cross-sectional shapes.

5. The structure for fixing a rotary head to a rotary drum of a video cassette recorder as claimed in claim 1, wherein said setting means comprises a hole mounted on said upper drum, and a set screw inserted into said hole.

6. In a video cassette recorder having structure for fixing a rotary head to a rotary drum of the video cassette recorder, the structure comprising:
   an elongated guide projection formed on a lower surface of said rotary head;
   an elongated guide groove formed in an upper portion of said rotary drum for engagement with the guide projection of said rotary head;
   said guide projection and guide groove when engaged being positioned such that a line parallel to the length of the projection and groove has a significant component extending radially to the axis of rotation of the drum;
   setting means mounted on said upper drum for fixing said guide projection of the rotary head to said upper drum within the guide groove of said upper drum with the guide projection in contact with the guide groove; and
   an adjustable member mounted on said upper drum, which member is arranged so that it may be adjusted to contact the guide projection of the rotary head and thereby adjust the height of said rotary head.

7. The structure for fixing a rotary head to a rotary drum of a video cassette recorder as claimed in claim 6, wherein when engaged with each other and fixed in position by said setting means, a gap between the guide projection of said rotary head and the guide groove of said upper drum is less than about 0.001 mm.

8. The structure for fixing a rotary head to a rotary drum of a video cassette recorder as claimed in claim 6, wherein the guide groove of said upper drum and the guide projection of said rotary head are of dovetail cross-sectional shapes.

9. The structure for fixing a rotary head to a rotary drum of a video cassette recorder as claimed in claim 6, wherein the guide groove of said upper drum and the guide projection of said rotary head are of circular cross-sectional shapes.

10. The structure for fixing a rotary head to a rotary drum of a video cassette recorder as claimed in claim 6, wherein said setting means comprises a hole mounted on said upper drum, and a set screw inserted into said hole.

* * * * *